INVENTORS
JOSEPH S. DERESKA
JAMES O. KOEHLER
ALBERT F. VINAL

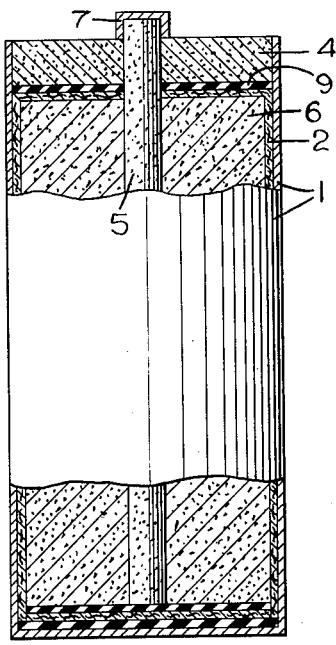
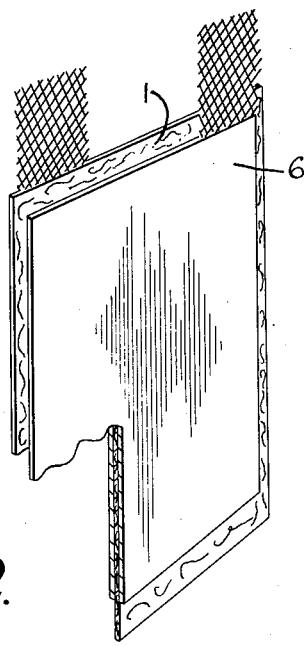
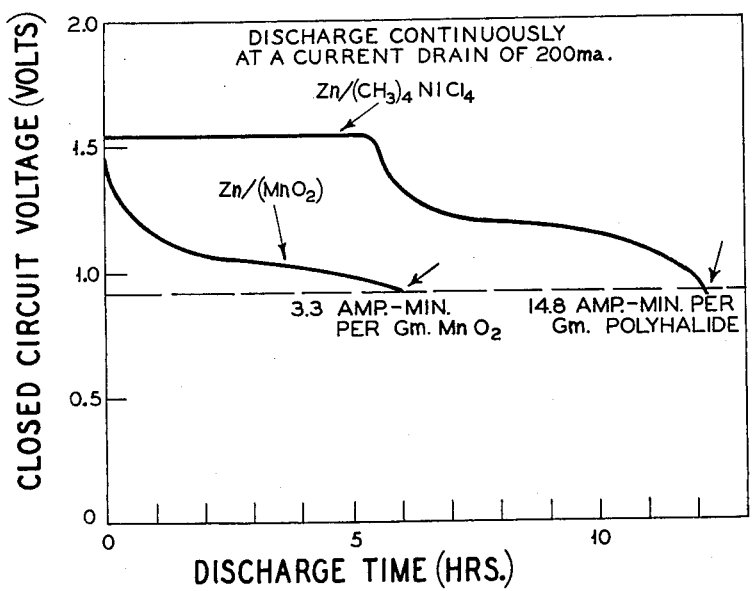
Fig. 1.
Fig. 2.
Fig. 3.

BY *John F. Hohmann*
ATTORNEY

United States Patent Office 3,057,760
Patented Oct. 9, 1962

3,057,760
POLYHALOGEN DEPOLARIZERS
Joseph S. Dereska, Parma, James O. Koehler, Parma Heights, and Albert F. Vinal, Shaker Heights, Ohio, assignors to Union Carbide Corporation, a corporation of New York
Filed July 5, 1960, Ser. No. 40,886
14 Claims. (Cl. 136—137)

This invention relates to polyhalogen depolarizers for use in galvanic cell systems.

Galvanic cells conventionally comprise a consumable anode, a separator, an electrolyte and a cathode depolarizer. Those cells which do not have efficiently reversible chemical reactions are termed primary cells. Where such cells are assembled without one of the essential components, such as the electrolyte, they are called deferred action cells. Cell systems which, after discharge, can be restored to essentially their original electrochemical state are termed rechargeable cells.

Heretofore most of the depolarizers used in the systems above mentioned have consisted of solid, metal oxides such as manganese dioxide, mercuric oxide and silver oxide. Such compounds have excellent depolarizing characteristics, but possess definite limitations as regards their potential levels, service capacities and other discharge characteristics. In this respect, it should be remembered that increasing technological advances are making greater performance demands on batteries, which demands appear to lie beyond the scope of cell systems employing metal oxide depolarizers. Therefore, a need exists for new depolarizers which can extend performance beyond the limitations of the metal oxides. Further, certain materials from which metal oxide depolarizers are prepared, such as manganese ores, are not always available in large quantity from local sources and must be imported. Tedious processing techniques are required to convert such ores to the active depolarizer form.

Accordingly, the main object of this invention is to provide novel polyhalogen depolarizers which will permit efficient operation at high current drains and at high voltage levels.

Another object of this invention is to provide an improved electrochemical system employing an organic or inorganic polyhalide depolarizer.

A further object of this invention is to provide an improved electrochemical system for galvanic cells utilizing organic or inorganic polyhalogen depolarizers which can be readily obtained from local sources using comparatively simple processing techniques.

In the drawings:

FIG. 1 is a sectional, elevational view of a cell employing the subject depolarizers;

FIG. 2 is a perspective view of a unit cell for a flat cell construction.

FIG. 3 is a graph illustrating the continuous discharge characteristics at 200 ma. of cells using certain depolarizers of the invention;

FIG. 6 is a graph the curves of which show the performance of a rechargeable cell in accord with the convention.

Figure 4:
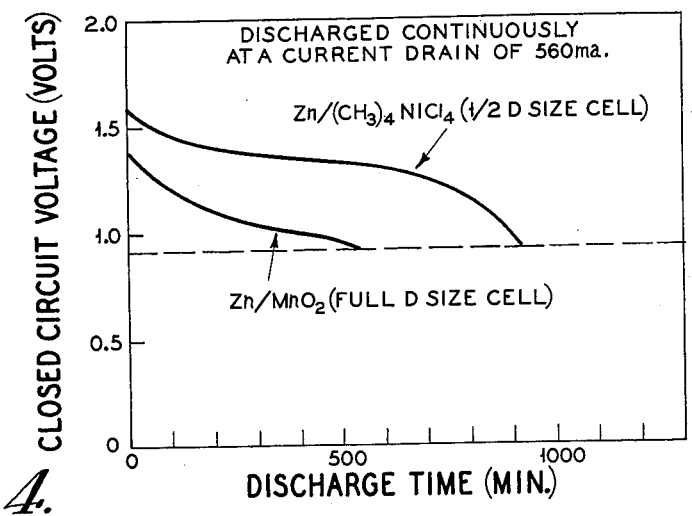
FIG. 4 is a graph illustrating the continuous discharge characteristics at 560 ma. of cells using certain depolarizers of the invention.

The polyhalogen compounds subject of the present invention are polyhalide salts and polyhalide complexes. By "polyhalide" salts are meant compounds consisting of an organic or inorganic cation having an atomic radius at least equal to that of potassium, and a homo- or hetero-polyhalide anion containing an odd number of halogen atoms. "Polyhalide" complexes are compounds consisting of an organic or inorganic electron donor containing a point of high electron density such as an amine, metal-ammonium complex, metal-amine complex, sulfide or phosphine and a polyhalogen electron acceptor.

The following are representative compounds comprehended by the above definitions.

A. Inorganic polyhalides:
    Potassium dichloriodide
    Potassium tetrachloriodide
    Cesium triiodide
    Cesium dichloriodide
    Cesium tetrachloriodide
    Cesium tribromide
    Cesium diiodochloride
    Cesium diiodobromide
    Cesium pentaiodide
    Cesium heptaiodide
    Cesium nonaiodide
    Cesium dibromoiodide
    Cesium dichlorobromide
    Rubidium triiodide
    Rubidium dichloriodide
    Rubidium tetrachloriodide
    Rubidium dichlorobromide
    Rubidium dibromochloride
    Rubidium diiodochloride
    Rubidium iodobromochloride B. Alkyl ammonium compounds:
  (a) Triiodides ($I_3^-$)—
    Tetramethylammonium
    Tetraethylammonium
    Tetrapropylammonium
    Tetrabutylammonium
  (b) Pentaiodides ($I_5^-$)—
    Tetramethylammonium
    Tetrapropylammonium
  (c) Heptaiodides ($I_7^-$)—
    Tetrapropylammonium
    Tetrabutylammonium
  (d) Nonaiodides ($I_9^-$)—Tetramethylammonium
  (e) Tribromides ($Br_3^-$)—
    Tetramethylammonium
    Tetraethylammonium
    Tetrabutylammonium
  (f) Dichlorobromide ($BrCl_2^-$)—
    Tetramethylammonium
    Tetraethylammonium
    Tetrapropylammonium
    Tetrabutylammonium
    Trimethylammonium
    Dimethylammonium
    Methylammonium
    Isopropylammonium
    t-Butylammonium
    Tri-n-propylammonium
    Di-n-butylammonium
  (g) Dichloroiodide ($ICl_2^-$)—
    Methylammonium
    Dimethylammonium
    Trimethylammonium
    Tetramethylammonium
    Ethylammonium
    Diethylammonium
    Tetraethylammonium
    Tetra-n-propylammonium
    Isopropylammonium
    t-Butylammonium
    Tetra-n-butylammonium
    n-Amylammonium
    n-Decylammonium
  (h) Dibromoiodide ($IBr_2^-$)—
    Methylammonium Dimethylammonium
Tetramethylammonium
Tetraethylammonium
Tetra-n-propylammonium
Tetra-n-butylammonium
Di-n-propylammonium
Tri-n-propylammonium
Tri-n-butylammonium
s-Butylammonium (i) Tetrachloroiodides ($ICl_4^-$)—
  Methylammonium
  Dimethylammonium
  Trimethylammonium
  Tetramethylammonium
  Ethylammonium
  Diethylammonium
  Triethylammonium
  Tetraethylammonium
  n-Propylammonium
  Tripropylammonium
  Tetra-n-propylammonium
  Isopropylammonium
  Diisopropylammonium
  Tetra-n-butylammonium
  n-Butylammonium
  s-Butylammonium
  n-Amylammonium
  n-Decylammonium (j) Diiodobromides ($I_2Br^-$)—
  Tetramethylammonium
  Tetraethylammonium
  Tetrapropylammonium
  Tetrabutylammonium (k) Diiodochlorides ($I_2Cl^-$)—
  Tetramethylammonium
  Tetraethylammonium
  Tetra-n-propylammonium
  Tetra-n-butylammonium (l) Tetraiodochloride ($I_4Cl^-$)—
  Tetramethylammonium (m) Chlorobromoiodides ($IBrCl^-$)—
  Tetramethylammonium
  Tetrapropylammonium
  Dimethylammonium
  Trimethylammonium
  Tetra-n-butylammonium
  Isopropylammonium (n) Dibromochlorides ($Br_2Cl^-$)—
  Tetramethylammonium C. Polyamines:
 (a) Triiodides ($I_3^-$)—
  Ethylenediamine
  Propylenediamine
  Triethylene tetramine
 (b) Tribromides ($Br_3^-$)—
  Ethylenediamine
  Triethylene tetramine
 (c) Dichlorobromides ($BrCl_2^-$)—
  Ethylenediamine
  Propylenediamine
  1,3 diaminopropane
  Tetraethylene pentamine
  Triethylene tetramine
 (d) Dichloroiodide ($ICl_2^-$)—
  Ethylenediamine
  Propylenediamine
  1,3 diaminopropane
  Triethylene tetramine
  Tetraethylene pentamine
 (e) Dibromoiodide ($IBr_2^-$)—
  Ethylenediamine
  Propyldiamine
  1,3-diaminopropane D. Heterocyclic amines:
 (a) Triiodides ($I_3^-$)—
  Melamine
  Morpholine
  2,5-diaminopyridine
  Pyrrolidine
  Pyrrol
  Piperidine
  Quinoline
  N-methylpyridine
  Pyridine
  2-methyl-5-ethylpyridine
  α-Picoline
  γ-Picoline
  Collidine
  8-methylquinoline
  6-nitroquinoline
  2-chloroquinoline
  6-chloroquinoline
  Quinaldine (b) Tribromides ($Br_3^-$)—
  Morpholine
  Pyrrolidine
  Piperidine
  Quinoline
  8-methylquinoline
  N-methylpyridine
  α-Picoline
  γ-Picoline
  Collidine
  6-nitroquinoline
  2-chloroquinoline
  Quinaldine (c) Dichlorobromides ($BrCl_2^-$)—
  Melamine
  Morpholine
  2,5-diaminopyridine
  Pyrrolidine
  Pyrrol
  Piperidine
  Quinoline
  N-methylpyridine
  Pyridine
  2-methyl-5-ethyl-pyridine
  α-Picoline
  γ-Picoline
  Collidine
  8-methylquinoline
  6-nitroquinoline
  2-chloroquinoline
  Quinaldine (d) Dichloroiodide—
  Melamine
  Morpholine
  2,5-diaminopyridine
  Pyrrolidine
  Pyrrol
  Piperidine
  Quinoline
  N-methylpyridine
  Pyridine
  2-methyl-5-ethylpyridine
  α-Picoline
  γ-Picoline
  Collidine
  8-methylquinoline
  6-nitroquinoline
  2-chloroquinoline
  Quinaldine
  Caffeine
  Quinine (e) Dibromoiodide—
  Morpholine
  Pyrrolidine
  Pyrrol
  Piperidine
  Quinoline N-methylpyridine
Pyridine
    α-Picoline
    γ-Picoline
Collidine
8-methylquinoline
6-nitroquinoline
2-chloroquinoline
Quinaldine
  (f) Tetrachloroiodide (ICl$_4^-$)—
Melamine
Morpholine
2,5-diaminopyridine
Pyrrolidine
Pyrrol
Piperidine
Piperazine
Quinoline
N-methylpyridine
2-methyl-5-ethylpyridine
    α-Picoline
    γ-Picoline
Collidine
8-methylquinoline
6-nitroquinoline
2-chloroquinoline
Quinaldine
Caffeine
Quinine
  (g) Diiodobromide (I$_2$Br$^-$)—
Pyridine
Quinoline
Morpholine
Piperidine
Piperazine
    α-Picoline
8-methylquinoline
  (h) Diiodochloride (I$_2$Cl$^-$)—
Pyridine
Quinoline
Morpholine
Piperidine
Piperazine
    α-Picoline
8-methylquinoline
  (i) Chlorobromoiodide (IBrCl)—
Morpholine
Pyrrolidine
Pyrrol
Piperidine
Quinoline
N-methylpyridine
Pyridine
    α-Picoline
    γ-Picoline
Collidine
8-methylquinoline
6-nitroquinoline
Piperazine
  (j) Dibromochloride (Br$_2$Cl$^-$)—
Pyridine
Quinoline
N-methylpyridine
    α-Picoline
    γ-Picoline
Collidine
8-methylquinoline
Pyrrolidine
E. Other Amines:
  (a) Triiodide (I$_3^-$)—
Benzyl amine
Dibenzyl amine
Tribenzylamine
  (b) Tribromide (Br$_3^-$)—Tribenzylamine
  (c) Dichlorobromide (BrCl$_2^-$)—
Benzyl amine
Dibenzylamine
Tribenzylamine
Urea
Guanidine
  (d) Dichloroiodide (ICl$_2^-$)—
Benzylamine
Dibenzylamine
Tribenzylamine
Urea
Guanidine
  (e) Dibromoiodide (IBr$_2^-$)—
Urea
Guanidine
Tribenzylamine
  (f) Tetrachloroiodide (ICl$_4^-$)—
Urea
Guanidine
Benzylamine
Dibenzylamine
Tribenzylamine
  (g) Diiodobromide (I$_2$Br$^-$)—Tribenzylamine
  (h) Diiodochloride (I$_2$Cl$^-$)—Tribenzylamine
  (i) Chlorobromoiodide (IBrCl$^-$)—
Benzylamine
Dibenzylamine
Tribenzylamine
Urea
Guanidine
  (j) Dibromochloride (Br$_2$Cl$^-$)—Tribenzylamine
F. Phosphorus and sulfur compounds:
  Trimethyl sulfonium dichloroiodide (CH$_3$)$_3$SICl$_2$
  Trimethyl sulfonium tetrachloroiodide (CH$_3$)$_3$SICl$_4$
  Trimethyl sulfonium triiodide (CH$_3$)$_3$SI$_3$
  Trimethyl sulfonium dichlorobromide
  Trimethyl sulfonium dibromoiodide
  Trimethyl sulfonium diiodochloride
  Trimethyl sulfonium diiodobromide
  Trimethyl sulfonium dibromochloride
  Trimethyl sulfonium chlorobromoiodide
  Triethyl sulfonium tetrachloroiodide
  Tributyl sulfonium tetrachloroiodide
  Tetramethyl phosphonium dichloroiodide
  Tetramethyl phosphonium tetrachloroiodide
  Tetramethyl phosphonium triiodide
  Tetramethyl phosphonium dibromoiodide
  Tetramethyl phosphonium dichlorobromide
  Tetramethyl phosphonium diiodochloride
  Tetramethyl phosphonium diiodobromide
  Tetramethyl phosphonium dibromochloride
  Tetraethyl phosphonium tetrachloride
  Triethyl methyl phosphonium tetrachloride
  Trimethyl ethyl phosphonium tetrachloride As shown in FIG. 1, the depolarizers of the invention can be incorporated in a cell consisting of a zinc can 1 lined with an ion-permeable separator 2. The can is filled with the cathode depolarizer mix 6. A carbon rod 5 is inserted in the mix to provide electric contact. The cell is sealed by an insulating washer 9, placed over the carbon collector rod in a layer of hard wax 4. A metal contact cap 7 is placed on the rod.

The cathode depolarizer mix is suitably prepared, for example, from a mixture consisting of 10 grams of tetramethylammonium tetrachloriodide, 8 grams of acetylene black and 20 mls. of a saturated ammonium chloride solution.

Flat reserve cells may use the mix, as shown in FIG. 2, which shows the configuration and construction of flat cells in which the organic depolarizers of the invention have been demonstrated to operate with great success. The depolarizer material may be included in the cathode plate construction or inserted between the cathode collector plate and the separator in electrical contact with the cathode lead.

The anode 1 and cathode 6 may be connected through an external source whereby the cell commences to be discharged by electrochemical action. The cell reactions proceed essentially as follows:

(Anode reaction)
$$2Zn \rightarrow 2Zn^{++} + 4e^-$$

(Cathode reaction)
$$(CH_3)_4NICl_4 + 3e \rightarrow (CH_3)_4N^+ + \tfrac{1}{2}I_2 + 4Cl^-$$

(Overall reaction)
$$6Zn + 4(CH_3)_4NICl_4 \rightarrow 4(CH_3)_4N^+ + 6Zn^{++} + 2I_2 + 16Cl^-$$

The above-described cathode reaction has been greatly simplified for the sake of illustration. Other reactions may occur instead of or simultaneously with that shown above. For example, a range of a four electron reduction of the anion can occur in which the iodine is reduced in valence from +3 to −1 as follows:

$$(CH_3)_4NICl_4 + 4e \rightarrow (CH_3)_4N^+ + I^- + 4Cl^-$$

The overall reaction in this instance would be:

$$2Zn + (CH_3)_4NICl_4 \rightarrow (CH_3)_4N^+ + 2Zn^{++} + I^- + 4Cl^-$$

Obviously, intermediate reduction reactions may occur as well. Many factors, e.g., current drain and pH of the electrolyte, will determine which reaction or combination of reactions occur.

Nevertheless, for the example given here, the overall cell reaction observed in practical applications may be written thus:

$$(CH_3)_4NICl_4 + 2Zn \rightarrow (CH_3)_4NI + 2ZnCl_2$$

Figure 5:
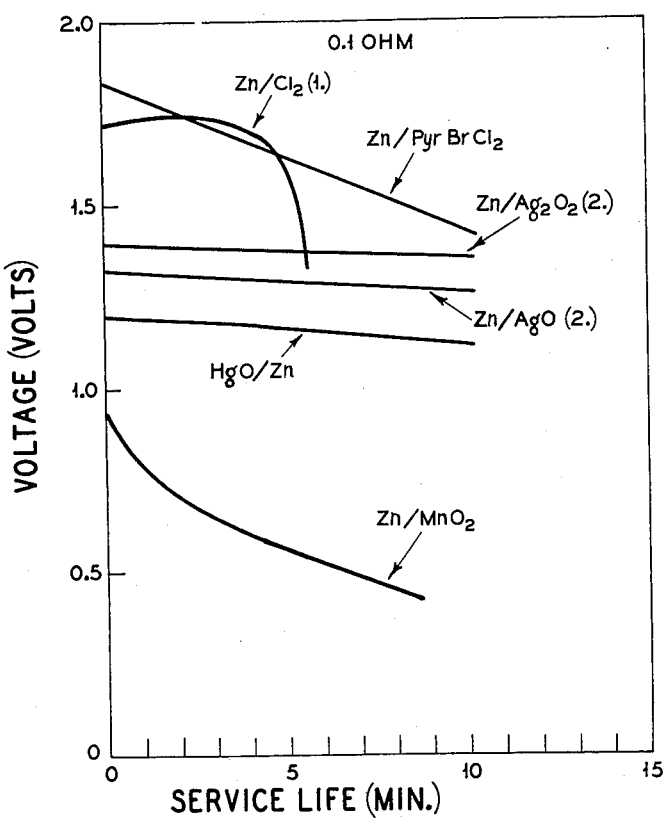
FIG. 5 is a graph comparing the service life of cells using various depolarizers.
Figure 9:
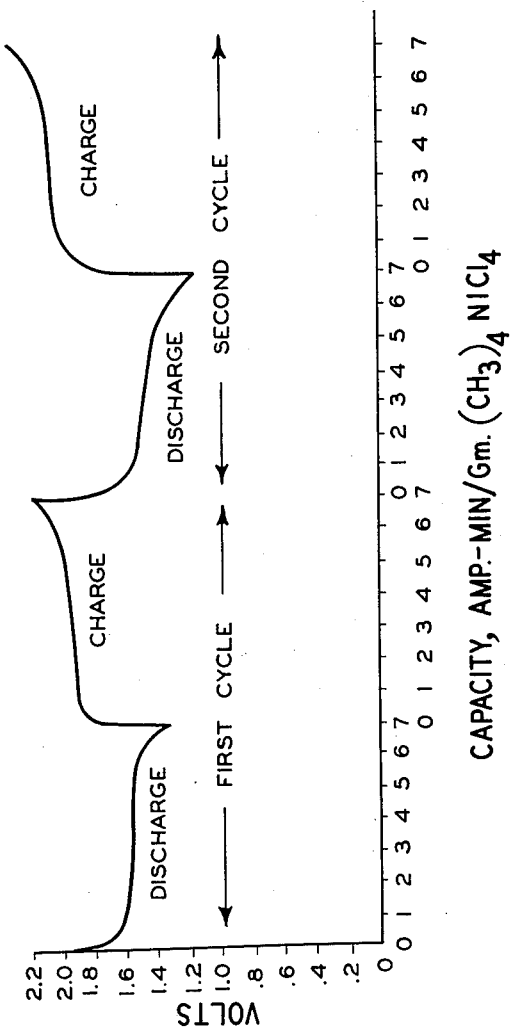

This reaction represents 72 percent of the theoretical capacity of the depolarizer based on a 4-electron reduction to a practical cutoff voltage of 0.9 volt. Performance of such cells having organic polyhalogen depolarizers is shown in FIGS. 3, 4 and 5 contrasted therein with the cells having the same depolarizer volume using conventional depolarizers in the same construction, with the same conditions of discharge.

*Anode.*—The anode for the primary cells of this invention may be zinc, cadmium, iron, aluminum or magnesium or other active metals or alloys or other active organics (e.g. hydroquinone). Zinc or magnesium-based alloys may also be used as anode material. In round cells the anode metal may be the cell container, lining for the container, a separate structure inserted into the container, or in the form of powdered metal. The anode may be in any geometrical configuration desired.

*Separator.*—It is necessary to separate the anode and cathode from each other; to accomplish this, a separator may be inserted between the two, although other methods of separation may be used. The separator may be any ionically permeable, natural or synthetic, material compatible with the electrolyte and depolarizer such as paper, plastic, methyl cellulose, carboxymethyl cellulose, cellophane, polyvinyl acetate, or a starch gel or a combination of several of such materials. Porous ceramics or other inorganic structures may be used in the place of the paper.

*Electrolytes.*—The electrolyte may be an ionized solution of a soluble salt or salts. Bromides and chlorides of the alkali and alkaline earth metals and ammonium and alkyl and aryl substituted ammonium cations are the most desirable soluble salts in the electrolyte. The electrolyte is prepared by dissolving the desired salt in water or other solvent. The concentration is not critical, and depends largely upon the salt combinations used. The most desirable concentrations are between 1 molar and saturated solutions at ordinary temperatuers. Examples of soluble salts useful in this invention are lithium, sodium, potassium, rubidium, cesium, calcium, magnesium, strontium, ammonium, and alkyl or aryl substituted ammonium chlorides and bromides. Immobilized electrolytes may be employed if desired. When magnesium is used as the anode, it is desirable to include in its electrolyte one or more alkali metal, alkaline earth metal or ammonium salts of chromic acid as corrosion inhibitors. The amount of the corrosion inhibitor varies between 0.1 and 2 percent of the electrolyte weight.

*Cathode depolarizer mix.*—According to this invention, the cathode depolarizer consists of an organic or inorganic polyhalide wherein the oxidizing properties are due to the polyhalide groups chemically combined in said substance. For increasing electrical conductivity of the cathode depolarizer, materials such as acetylene black or graphite may be used in an amount ranging from about 20 to 70 percent by weight of the mix.

For certain deferred action cell applications, principally where long shelf life is required, it is desirable to omit one of the essential components until need for electrical energy has arisen. The primary cells of this invention are convertible into such cells, by simply omitting the electrolyte until just prior to use. To avoid aggravated anodic corrosion conditions in deferred action cell applications, the anode can be additionally protected by a thin coating of a water-soluble material such as polyvinyl alcohol. Upon contact with aqueous electrolyte, the film dissolves and the cell is ready for use.

Table I below contains representative examples of experimental cell systems utilizing the depolarizers of the subject invention using various amounts of a finely divided carbon (acetylene black) the balance of the depolarizer mix being the polyhalogens. Table II shows discharge data on reserve cell applications of these depolarizers.

TABLE I

*Polyhalogen Depolarizers Laboratory Test Cells*

| Cathode | | Anode Metal | Electrolyte | | Voltage | | Res. Ohm |
|---|---|---|---|---|---|---|---|
| Compound | Carbon Type Percent | | Type | Vol. | O.C. | C.C. | |
| KICl$_2$ | AB,[1] 33 | Zn | KCl | 100 | 1.70 | 1.57 | 5.5 |
| (CH$_3$)$_4$NICl$_4$ | AB, 33 | Zn | NH$_4$Cl | 200 | 1.79 | 1.70 | 12.0 |
| (CH$_3$)$_4$NICl$_2$ | AB, 67 | Zn | NH$_4$Cl | 200 | 1.75 | 1.35 | 8.4 |
| Methyl-pyridinium ICl$_4$ | AB, 67 | Zn | KCl | 200 | 1.92 | 1.41 | 5.4 |
| Tetramethyl Phosphonium ICl$_4$ | AB, 67 | Mg | ZnCl$_2$ | 200 | 2.27 | 1.90 | 3.8 |
| Quinolinium ICl$_4$ | AB, 67 | Zn | NH$_4$Cl | 200 | 1.86 | 1.38 | 3.0 |
| -Picolinium ICl$_4$ | AB, 67 | Zn | NH$_4$Cl | 200 | 2.00 | 1.64 | 2.0 |
| Pyrrolidinium ICl$_4$ | AB, 67 | Zn | NH$_4$Cl | 200 | 1.96 | 1.61 | 2.0 |
| Piperidinium ICl$_4$ | AB, 67 | Zn | NH$_4$Cl | 200 | 1.92 | 1.58 | 3.0 |

| Cathode Compound | Discharge Data | | | Capacity | |
|---|---|---|---|---|---|
| | I, Amp. | CD, ma./g. | CD, ma./cc. | Amp., min./g. | Eff. Percent |
| KICl$_2$ | 150 | 750 | 8.5 | 3.97 | 29.3 |
| (CH$_3$)$_4$NICl$_4$ | 50 | 58.3 | 2.5 | 4.00 | 32.0 |
| (CH$_3$)$_4$NICl$_2$ | 50 | 250 | 2.80 | 4.00 | 32 |
| Methylpyridinium ICl$_4$ | 150 | 750 | 8.5 | 15.75 | 88.8 |
| Tetramethyl Phosphonium ICl$_4$ | 220 | 1,100 | 12.85 | 16.5 | 92 |
| Quinolinium ICl$_4$ | 50 | 250 | 2.83 | 10.5 | 65 |
| -Picolinium ICl$_4$ | 50 | 250 | 2.83 | 4.25 | 24 |
| Pyrrolidinium ICl$_4$ | 50 | 250 | 2.83 | 11.0 | 60 |
| Piperidinium ICl$_4$ | 50 | 250 | 2.83 | 5.75 | 31.4 |

[1] Acetylene black.

TABLE II

Deferred Action Cells

| Polyhalide Depolarizer | Cathode Mix[1] Weight/Cell, gms. | Voltage Initial O.C. | C.C.[2] |
|---|---|---|---|
| $(CH_3)_4NICl_4$ | 12 | 1.84 | 1.58 |
| $(CH_3)_3NHICl_4$ | 12 | 2.16 | 1.33 |
| $(CH_3)_2NH_2ICl_4$ | 12 | 2.16 | 1.54 |
| $CH_3NH_3ICl_4$ | 12 | 2.09 | 1.20 |
| $(CH_3)_3NICl_3$ | 12 | 2.02 | 1.14 |
| $KICl_4$ | 12 | 2.06 | 1.46 |
| Pyridinium $ICl_3$ | 12 | 1.92 | 0.92 |
| Pyridinium $ICl_4$ | 12 | 1.96 | 1.10 |
| Pyridinium $BrCl_2$ | 15 | 2.09 | 1.75 |
| Pyridinium $Br_2Cl$ | 15 | 1.99 | 1.66 |
| Melamine Tri-$(ICl_4)$ | 12 | 2.08 | 1.42 |
| Guanidinium $ICl_4$ | 15 | 1.88 | 1.20 |
| Piperazinium Di-$(ICl_4)$ | 12 | 2.07 | 1.18 |

| Polyhalide Depolarizer | Voltage Regulation—8.5 min., percent | Initial, Current Density ma./sq. in. |
|---|---|---|
| $(CH_3)_4NICl_4$ | ±11.8 | 860 |
| $(CH_3)_3NHICl_4$ | ±8.6 | 860 |
| $(CH_3)_2NH_2ICl_4$ | ±14.1 | 970 |
| $CH_3NH_3ICl_4$ | ±4.8 | 777 |
| $(CH_3)_3NICl_3$ | ±9.6 | 780 |
| $KICl_4$ | ±6.6 | 691 |
| Pyridinium $ICl_3$ | ±6.4 | 630 |
| Pyridinium $ICl_4$ | ±1.9 | 701 |
| Pyridinium $BrCl_2$ | ±18.2 | 1,000 |
| Pyridinium $Br_2Cl$ | ±11.5 | 879 |
| Melamine Tri-$(ICl_4)$ | ±11.8 | 980 |
| Guanidinium $ICl_4$ | ±11.1 | 684 |
| Piperazinium Di-$(ICl_4)$ | ±12.4 | 800 |

[1] 4:1 ratio depolarizer/graphite.
[2] Fixed resistance external load—0.15 ohms, test at room temperature.

All cells flat plate construction—anode and cathode areas each approximately 10.2 square inches.
Anodes—powdered zinc type on supporting metal grid.
Separators—matte of plastic.
Electrolyte—$CaCl_2$ eutectic type (low temperature).
Regulation—Variation in voltage over first 8.5 minutes of operation expressed as percent of total operating voltage.

To show the broad application of the subject depolarizers, a rechargeable cell construction was made using one of the depolarizers of this invention, specifically, $(CH_3)_4NICl_4$. Ten grams of the depolarizer were mixed with 10 grams of acetylene black and $NH_4Cl$ electrolyte added to form a paste. The cathode depolarizer paste was then applied to both sides of a porous carbon plate which served as the cathode current collector. For test purposes only, two powdered zinc anodes were employed, one on either side of the cathode construction. Plastic separators consisting of a material marketed under the trade name of "Dynel" were used to line the anodes. About 80 cc. of $NH_4Cl$ electrolyte were added after the electrodes were positioned in the cell container. The cell was discharged and charged at 5 amperes for two cycles, using only a part of the theoretical capacity (70 amp.-min. or 7.0 amp.-min. per gram of depolarizer) to maintain operation at a relatively high, level voltage. Results are shown in FIG. 6. These results prove the efficacy of the subject compounds as depolarizers in a rechargeable cell system.

From the foregoing, it is apparent that the objects of the invention have been realized and that a new class of depolarizers has been found, which is of wide application in many cell systems.

What is claimed is:
1. A galvanic cell comprising an anode, a depolarizer-cathode, and an electrolyte, said depolarizer-cathode containing a polyhalogen compound consisting of at least one negatively charged component composed of at least three halogen atoms and a positively charged component selected from the group consisting of alkali metal cations having an atomic radius at least equal to that of potassium and onium radicals of polyamines, heterocyclic amines, arylamines, sulfides, and phosphines.

2. A galvanic cell comprising an anode, a depolarizer-cathode, and an electrolyte, said depolarizer-cathode containing a polyhalogen compound consisting of at least one negatively charged component composed of at least three halogen atoms and a positively charged component composed of an alkali metal cation having an atomic radius at least equal to that of potassium.

3. The galvanic cell defined in claim 2 wherein said alkali metal cation is selected from the group consisting of potassium, cesium, and rubidium.

4. A galvanic cell comprising an anode, a depolarizer-cathode, and an electrolyte, said depolarizer-cathode containing a polyhalogen compound consisting of at least one negatively charged component comopsed of at least three halogen atoms and a positively charged component composed of an onium radical of a polyamine.

5. The galvanic cell defined in claim 4 wherein said polyamine is selected from the group consisting of urea, guanidine, and the alkylenepolyamines.

6. A galvanic cell comprising an anode, a depolarizer-cathode, and an electrolyte, said depolarizer-cathode containing a polyhalogen compound consisting of at least one negatively charged component composed of at least three halogen atoms and a positively charged component composed of an onium radical of a heterocyclic amine.

7. The galvanic cell defined in claim 6 wherein said heterocyclic amine is selected from the group consisting of melamine, morpholine, pyridine, pyrolidine, pyrrole, piperidine, quinoline, picoline, collidine, quinaldine, piperazine, caffeine, and quinine.

8. A galvanic cell comprising an anode, a depolarizer-cathode, and an electrolyte, said depolarizer-cathode containing a polyhalogen compound consisting of at least one negatively charged component composed of at least three halogen atoms and a positively charged component composed of an onium radical of an arylamine.

9. The galvanic cell defined in claim 8 wherein said arylamine is selected from the group consisting of benzylamine, dibenzylamine, and tribenzylamine.

10. A galvanic cell comprising an anode, a depolarizer-cathode, and an electrolyte, said depolarizer-cathode containing a polyhalogen compound consisting of at least one negatively charged component composed of at least three halogen atoms and a positively charged component composed of a sulfonium radical.

11. The galvanic cell defined in claim 10 wherein said sulfonium radical is an alkyl sulfonium radical.

12. A galvanic cell comprising an anode, a depolarizer-cathode, and an electrolyte, said depolarizer-cathode containing a polyhalogen compound consisting of at least one negatively charged component composed of at least three halogen atoms and a positively charged component composed of a phosphonium radical.

13. The galvanic cell defined in claim 12 wherein said phosphonium radical is an alkyl phosphonium radical.

14. A deferred action galvanic cell comprising an anode having on at least one surface a protective film composed of a water-soluble material, a depolarizer-cathode, and an electrolyte separated from said anode, but placed so as to establish contact with said anode upon actuation by external means, said depolarizer-cathode containing a polyhalogen compound consisting of at least one negatively charged component composed of at least three halogen atoms and a positively charged component selected from the group consisting of alkali metal cations having an atomic radius at least equal to that of potassium and onium radicals of polyamines, heterocyclic amines, arylamines, sulfides, and phosphines.

References Cited in the file of this patent

UNITED STATES PATENTS

| | | |
|---|---|---|
| 2,528,891 | Lawson | Nov. 7, 1950 |
| 2,566,114 | Block | Aug. 28, 1951 |
| 2,874,079 | Lozier et al. | Feb. 17, 1959 |
| 2,874,204 | Morehouse et al. | Feb. 17, 1959 |

FOREIGN PATENTS

| | | |
|---|---|---|
| 240,140 | Great Britain | July 15, 1926 |
| 461,350 | Canada | Nov. 29, 1949 |